United States Patent Office 3,165,533
Patented Jan. 12, 1965

3,165,533
DIHYDROACTINOSPECTACIN, AMIDES
AND ESTERS THEREOF
Herman Hoeksema, Kalamazoo, and Paul F. Wiley, Texas Township, Kalamazoo County, Mich., assignors to The Upjohn Company, Kalamazoo, Mich., a corporation of Delaware
No Drawing. Filed Jan. 22, 1962, Ser. No. 167,931
7 Claims. (Cl. 260—340.3)

This invention is related to novel compositions of matter and to a process for the preparation thereof, and is particularly directed to the novel compound, dihydroactinospectacin, and its acyl derivatives and to a process for producing the same.

Actinospectacin is a biosynthetic product produced by the controlled fermentation of *Streptomyces spectabilis*. Various methods for the production, recovery, and purification of actinospectacin are described in the published literature, e.g., D. J. Mason et al., Antibiotics and Chemotherapy, 11 p. 118, 1961; M. E. Bergy et al., Antibiotics and Chemotherapy, 11, p. 661, 1961; Union of South Africa Patent No. 60/4098 and Belgian Patent No. 596,175. Actinospectacin is characterized by an optical rotation $[\alpha]_D^{25} = -20°$ ($H_2O$); by solubility in water, methanol, and ethanol, and by insolubility in acetone and hydrocarbon solvents; and by the presence of two basic groups: $pKa_1$ 6.95 ($H_2O$), $pKa_2$ 8.70 ($H_2O$). It was formerly thought that the molecular formula was $C_{14}H_{26}N_2O_7$, but it has since been shown that the formula is $C_{14}H_{24}N_2O_7$.

It has now been found that a novel compound, according to this invention, is obtained by the reduction of actinospectacin. On reduction, actinospectacin is converted to dihydroactinospectacin which upon acylation is converted to its di-N-acyl and tetra-N,O-acyl derivatives.

Subsequent to this invention, the structure of actinospectacin has been elucidated. Dihydroactinospectacin, therefore, can now be represented by the following formula:

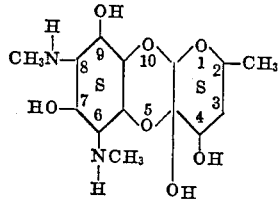

On acylation with two moles of acylating agent, there is obtained N,N'-diacyldihydroactinospectacin which on further acylation yields N,N'-diacyldihydroactinospectacin 4,9-diacylate having the following formula:

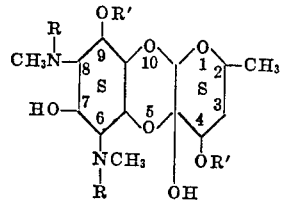

wherein R and R' are selected from the group consisting of hydrocarbon carboxylic acyl of from two to twelve carbon atoms, inclusive; halo-, nitro-, hydroxy-, amino-, cyano-, thiocyano- and lower alkoxy-substituted hydrocarbon carboxylic acid acyl of from two to twelve carbon atoms, inclusive; and lower alkoxycarbonyl.

The term "hydrocarbon carboxylic acid acyl of from two to twelve carbon atoms" whenever used in the specification or claims is intended to mean an acyl corresponding to a hydrocarbon carboxylic acid of from two to twelve carbon atoms, inclusive. Suitably such acids include (a) a saturated or unsaturated, straight or branched chain aliphatic carboxylic acid, for example, acetic, propionic, butyric, isobutyric, tert-butylacetic, valeric, isovaleric, caproic, caprylic, decanoic, dodecanoic, acrylic, crotonic, hexynoic, heptynoic, octynoic acids, and the like; (b) a saturated or unsaturated alicyclic carboxylic acid, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) a saturated or unsaturated substituted alicyclic aliphatic carboxylic acid, for example, cyclopentaneacetic acid, cyclopentanepropionic acid, cyclopenteneacetic acid, cyclohexanebutyric acid, methylcyclohexaneacetic acid, and the like; (d) an aromatic carboxylic acid, for example, benzoic acid, toluic acid, naphthoic acid, ethylbenzoic acid, isobutylbenzoic acid, methylbutylbenzoic acid, and the like; and (e) an aromatic-aliphatic carboxylic acid, for example, phenylacetic acid, phenylpropionic acid, phenylvaleric acid, cinnamic acid, phenylpropiolic acid, naphthylacetic acid, and the like.

The term "halogen-, nitro-, hydroxy-, amino-, cyano-, thiocyano-, and lower alkoxy-substituted hydrocarbon carboxylic acid acyl·of from two to twelve carbon atoms, inclusive" is intended to mean hydrocarbon carboxylic acid acyl as hereinbefore defined which are substituted by one or more halogen atoms, nitro, hydroxy, amino, cyano, thiocyano, or lower alkoxy groups. By "lower alkoxy" is meant an alkoxy group of from one to six carbon atoms, inclusive, for example, methoxy, ethoxy, propoxy, butoxy, pentyloxy, hexyloxy, and isomeric forms thereof. Examples of substituted hydrocarbon carboxylic acid acyl falling within the above definition are the acyl corresponding to chloroacetic acid, chloropropionic acid, bromobutyric acid, iodovaleric acid, chlorocyclohexanecarboxylic acid, o-, m-, and p-chlorobenzoic acid, anisic acid, salicylic acid, p-hydroxybenzoic acid, o-, m-, and p-nitrobenzoic acid, cyanoacetic acid, thiocyanoacetic acid, cyanopropionic acid, lactic acid, glycine, ethoxyformic, and the like.

Dihydroactinospectacin is obtained either by chemical or catalytic reduction of actinospectacin. In either case the oxo group in the actinospectacin molecule is reduced to an oxy group. Thus, on reacting actinospectacin with sodium borohydride, or on hydrogenation of actinospectacin with platinum oxide, dihydroactinospectacin is obtained. In both cases the dihydroactinospectacin is usually recovered as a salt which can be converted to the free base by treatment with a strongly basic anion exchange resin. [Suitable anion exchange resins for this purpose are obtained by chloromethylating by the procedure given on pages 88 and 97 of Kunin, Ion Exchange Resins, 2nd Ed., (1958), John Wiley and Sons, Inc., polystyrene cross-linked, if desired, with divinylbenzene prepared by the procedure given on page 84 of Kunin, supra, and quaternizing with trimethylamine or dimethylalkanolamine by the procedure given on page 97 of Kunin, supra. Anion exchange resins of this type are marketed under the trade names Dowex-2, Dowex-20, Amberlite IRA-400, Duolite A-102, and Permutit S-1. Crude dihydroactinospectacin can be upgraded by passage over a cation exchange resin. Both carboxylic acid and sulfonic acid types can be used. Suitable carboxylic acid resins include the polyacrylic acid resins obtained by the copolymerization of acrylic acid and divinylbenzene by the procedure given on page 87 of Kunin, Ion Exchange Resins, 2nd ed., (1958), John Wiley and Sons, Inc. Carboxylic acid cation exchange resins of this type are marketed under the trade names Amberlite IRC-50 and Zeokarb 226. Suitable sulfonic acid resins include nuclear sulfonated polystyrene resins crosslinked with divinylbenzene obtained by the procedure given on page 84 of Kunin, supra. Sulfonated cation exchange resins of this type are marketed under the trade names Dowex-50, Amberlite IR-120, Nalcite HCR, Chempro C-20, Permutit Q, and Zeokarb 225.]

The di-N-acyl and tetra-N,O-acyl derivatives of dihydroactinospectacin, according to the invention, are obtained by acylating dihydroactinospectacin. When dihydroactinospectacin is reacted with an appropriate acid anhydride or chloride, the corresponding N,N'-diacyl- and N,N'-diacyldihydroactinospectacin 4,9-diacylate are obtained. For example, on reacting dihydroactinospectacin with about two moles of acetic anhydride in the presence of pyridine, N,N'-diacetyldihydroactinospectacin is obtained. On further acylation of the diacyl or on acylation of actinospectacin with four or more moles of acetic anhydride, N,N'-di-acetyldihydroactinospectacin 4,9-diacetate is obtained. Also, on reacting dihydroactinospectacin with ethyl chloroformate (ethyl chlorocarbonate) in the presence of pyridine, N,N'-diethoxycarbonyldihydroactinospectacin and N,N'-diethoxycarbonyldihydroactinospectacin 4,9-bis-(ethyl carbonate) are obtained according to the proportions of acylating agent used. Mixed acylates can be obtained by acylating the N,N'-diacyldihydroactinospectacin with a different acylating agent. For example, on reacting N,N'-diacetyldihydroacetinospectacin with sodium propionate and propionic anhydride the corresponding mixed acylate is obtained.

Various salts of dihydroactinospectacin can be made by contacting the starting material with acids, for example, hydrogen chloride, hydrogen bromide, hydrogen iodide, sulfuric acid, phosphoric acid, picric acid, helianthic acid, Reinecke's acid, succinic acid, maleic acid, latic acid, trichloroacetic acid, and the like. These salts are useful as intermediates from which high purity dihydroactinospectacin and its acyl derivatives can be recovered when desired by treatment with an anion exchange resin as described above.

The novel compound of the invention, dihydroactinospectacin, has antibacterial activity as shown in the following Table I.

TABLE I

| Microorganism: | MIC* (mcg./ml.) |
|---|---|
| Escherichia coli | 32 |
| Proteus vulgaris | 250 |
| Klebsiella pneumoniae | 16 |
| Pseudomonas aeruginosa | 250 |
| Salmonella typhosa | 64 |
| Staphylococcus aureus | 32 |
| Staphylococcus albus | 64 |
| Streptococcus faecalis | 32 |

*Minimum inhibitory concentration.

The assay was run using a standard streptomycin assay broth at a pH of 8.0, (beef extract 1.5 gm./liter, yeast extract 3.0 gm./liter, peptone 6 gm./liter in distilled water and adjusted to pH 8.0 after sterilization).

Dihydroactinospectacin is useful in preventing the growth and multiplication of various microorganisms in many environments. It can be used, for example, to deliquefaciens which causes infectious dropsy or to treat fish affected by this organism. Also, this compound can be used to inhibit the growth of the bacterium, Flavobacterium suaveolans which is a common contaminant of the papermill industry. Further, this novel compound can be used to inhibit the growth of Erysipelothrix rhusiopathiae which is a pathogen found in swine, sheep, turkeys, pigeons, and mice.

The novel compounds of the invention, N,N'-diacyldihydroactinospectacin and N,N'-diacyldihydroactinospectacin 4,9-diacylate are useful as intermediates to make 1,3-deoxy-1,3-bis(methylamino)myoinositol which has been given the trivial name actinamine. Actinamine can be acetylated to hexaacetylactinamine. The reaction can be carried out by acid hydrolysis of the starting material, e.g., N,N'-diacyldihydroactinospectacin or N,N'-diacyldihydroactinospectacin 4,9-diacylate. Hydrolysis is effected by contact thereof with an acidic material, e.g., a strong mineral acid such as hydrogen chloride, hydrogen bromide, hydrogen iodide, sulfuric acid, phosphoric acid, and the like. Preferably, hydrochloric acid is used as a hydrolyzing agent and when so used the actinamine is isolated as the hydrochloride. The other acids listed may also be used for the hydrolysis and when so used the product is isolated as the corresponding mineral acid salt. The actinamine can then be further acylated to hexaacetylactinamine. Actinamine is useful in accordance with U.S. Patents 1,915,334 and 2,075,359, in preparing amine fluosilicate moth-proofing agents, and in accordance with U.S. Patents 2,425,320 and 2,606,155, in preparing amine thiocyanate-formaldehyde condensation products for use as pickling inhibitors. Hexaacetylactinamine has antibacterial activity and can be used to decontaminate aquaria of the fish pathogen Aeromonas liquefaciens which causes infectious dropsy or to treat fish affected by this organism. Also, this novel compound can be used to inhibit the growth of the bacterium Flavobacterium suaveolans which is a common contaminant of the papermill industry. Further, this novel compound can be used to inhibit the growth of Erysipelothrix rhusiopathiae which is a pathogen found in swine, sheep, turkeys, pigeons, and mice.

The following examples are illustrative of the process and products of the present invention but are not to be construed as limiting.

*Example 1.—Dihydroactinospectacin*

A. Catalytic reduction: A suspension of 2.7 g. of actinospectacin dihydrochloride in 100 ml. of 50% ethanol was hydrogenated in the presence of 300 mg. of platinum oxide for 3 days at 40 p.s.i.g. hydrogen pressure in a Parr apparatus. Following filtration and evaporation to an aqueous solution, acetone was added and crystallization occurred, yielding 1.45 g. of dihydroactinospectacin dihydrochloride with a melting point of 203–210° C. Recrystallization yielded dihydroactinospectacin dihydrochloride crystals having a melting point of 205–208° C. and an optical rotation $[\alpha]_D^{25} = +33°$ (C., 1% in water).

Elemental analysis.—Calculated for $C_{14}H_{26}N_2O_7 \cdot 2HCl$:

C, 41.28; H, 6.93; Cl, 17.41. Found: C, 41.78; H, 7.12; Cl, 17.39.

B. Borohydride reduction: Sodium borohydride (2.3 g.) was added slowly to a solution of 10 g. of actinospectacin in 500 ml. of anhydrous methanol. After standing at room temperature for 2½ hrs. the solution was adjusted to pH 3.0 with 6.0 N hydrochloric acid, and then evaporated to dryness under reduced pressure. The resulting residue was dissolved in methanol, filtered, and the filtrate evaporated to dryness under reduced pressure. This was done twice using 250 ml. portions of methanol, once using 150 ml. of methanol, and once using 50 ml. of methanol. The final residue was dissolved again in 50 ml. of methanol and precipitated with ether. The precipitate was removed by filtration, dried in a vacuum desiccator and then dissolved in 3.0 N hydrochloric acid using 4 ml. of acid per gram of precipitate. Upon the addition of acetone to this solution and refrigerating, crystallization occurred, yielding 3.8 g. of material melting at 199 to 205° C. Two grams of this material was dissolved in 20 ml. of water and passed over 30 g. of a strongly basic anion exchange resin (the anion exchange resin used for this purpose was obtained by chloromethylating by the procedure given on pages 88 and 97 of Kunin, Ion Exchange Resins, 2nd Ed., (1958), John Wiley and Sons, Inc., polystyrene crosslinked with 5% divinylbenzene prepared by the procedure given on page 84 of Kunin, supra, and quaternized with trimethylamine by the procedure given on page 97 of Kunin, supra). The column was washed with water until the washings were neutral. The combined washings and effluent were freeze-dried. The residue was then dissolved in water and put on 30 g. of a carboxylic acid cation exchange resin. (The carboxylic acid cation exchange resin used for this purpose was obtained by the copolymerization of acrylic acid and 5% divinylbenzene by the procedure given on page 87 of Kunin, Ion Exchange Resins, 2nd Ed., (1958), John Wiley and Sons, Inc.) The column was eluted with 300 ml. of 1.0 N hydrochloric acid. The eluate was adjusted to pH 4.0 with a strongly basic anion exchange resin of the type described above. The resin was removed and the solution freeze-dried and then recrystallized twice from a water-acetone mixture to yield dihydroactinospectacin dihydrochloride crystals having a melting point of 204–206° C., a pKa$_1$ of 7.0 and a pKa$_2$ of 8.8, an equivalent weight of 211.5, and an optical rotation $[\alpha]_D^{25} = 28°$ (c.=1% in water).

Elemental analysis.—Calculated for $C_{14}H_{26}N_2O_7 \cdot 2HCl$: C, 41.28; H, 6.93; N, 6.88; Cl, 17.41. Found: C, 43.54; H, 7.15; N, 6.57; Cl, 17.05.

The dihydrochloride was converted to the base by the following procedure. A solution of 2 g. of dihydroactinospectacin dihydrochloride in 20 ml. of water was poured over 30 g. of a strongly basic anion exchange resin of the type previously described. The column was washed with water until the washings were neutral. The combined effluent and washings were freeze-dried to yield 1.3 g. of dihydroactinospectacin.

Elemental analysis.—Calculated for $C_{14}H_{26}N_2O_7$: C, 50.39; H, 7.84; N, 8.38. Found: C, 49.59; H, 8.24; N, 8.24

*Example 2.—N,N'-Diacetyldihydroactinospectacin*

20.3 g. of dihydroactinospectacin base was dried by vacuum distilling 200 ml. of absolute ethanol from it. This was repeated. The dry dihydroactinospectacin base was then dissolved in 600 ml. of pyridine and the solution evaporated in vacuo to 100 ml. To this was slowly added 9.45 ml. of acetic anhydride with stirring and chilling. The solution was then stored 3 days at room temperature. Volatile products were removed by vacuum distillation and the residue was dissolved in 50 ml. of pyridine and 100 ml. of chloroform. Precipitation occurred on the addition of 4 to 6 vols. of Skellysolve B (isomeric hexanes) to yield 23 g. of product. This material was then fractionated in a Craig countercurrent distribution apparatus using a solvent system n-butanol: water (1:1) to yield 13.8 g. of N,N'-diacetyldihydroactinospectacin having an optical rotation $[\alpha]_D^{25} = -15°$ (c., 1% in ethanol). Potentiometric titration indicated the absence of any basic functions.

Elemental analysis.—Calculated for $C_{18}H_{30}N_2O_9$: C, 51.66; H, 7.23; N, 6.70; C–CH$_3$, 10.8. Found: C, 50.73; H, 7.72; N, 6.67; C–CH$_3$, 10.9.

*Example 3.—N,N'-Diacetyldihydroactinospectacin 4,9-Diacetate*

A solution of 10 g. of dihydroactinospectacin base and 300 ml. of pyridine was distilled to 100 ml. in vacuo. The resulting solution was diluted to 200 ml. with dry pyridine and treated with 5.8 ml. of acetic anhydride. After eight days of storage at room temperature, the readily volatile products were removed by distillation in vacuo, and the residue was leached with ethyl acetate to remove 900 mgs. of N,N'-diacetyldihydroactinospectacin. The remaining residue was redissolved in 100 ml. of pyridine and treated with 5 ml. of acetic anhydride. After three days the volatile materials were removed as before, and the residue was dissolved in ethyl acetate and precipitated with Skellysolve B. This precipitate (6.65 g.) was distributed in a countercurrent distribution using water and n-butanol (1:1) as the system for 500 transfers. N,N'-diacetyldihydroactinospectacin 4,9-diacetate was isolated from the peak fractions as a white amorphous solid with a melting point of 175 to 185° C. and an optical rotation $[\alpha]_D^{25} = -8°$ (c., 1% in chloroform).

Elemental analysis.—Calculated for $C_{22}H_{34}N_2O_{11}$: C, 52.58; H, 6.82; N, 5.58; acetyl, 33.50 (molecular weight, 502.51). Found: C, 52.39; H, 6.87; N, 5.37; acetyl, 32.80.

*Example 4*

By substituting the acetic anhydride in Example 2 by propionic anhydride, there is obtained N,N'-dipropionyldihydroactinospectacin.

*Example 5*

By substituting the acetic anhydride in Example 3 by propionic anhydride, there is obtained N,N'-dipropionyldihydroactinospectacin 4,9-diacetate.

*Example 6*

By substituting the acetic anhydride and pyridine in Example 2 by acetyl chloride, propionyl bromide, butyryl chloride, valeryl chloride, caproyl chloride, heptanoyl chloride, and caprylyl chloride, and at least a stoichiometric amount of triethylamine there are obtained N,N'-diacetyl-, N,N'-dipropionyl-, N,N'-dibutyryl-, N,N'-divaleryl-, N,N'-dicaprol-, N,N'-diheptanoyl-, and N,N'-dicaprylyldihydroactinospectacin.

*Example 7*

By substituting the acetic anhydride and pyridine in Example 3 by acetyl chloride, propionyl bromide, butyryl chloride, valeryl chloride, caproyl chloride, heptanoyl chloride, and caprylyl chloride, and at least a stoichiometric amount of triethylamine there are obtained N,N'-diacetyldihydroactinospectacin 4,9-diacetate, N,N'-dipropionyldihydroactinospectacin 4,9-dipropionate, N,N'-dibutyryldihydroactinospectacin 4,9-dibutyrate, N,N'-divaleryldihydroactinospectacin 4,9-divalerate, N,N'-dicaproyldihydroactinospectacin 4,9-dicaproate, N,N'-diheptanoyldihydroactinospectacin 4,9-diheptanoate, and N,N'-dicaprylyldihydroactinospectacin 4,9-dicaprylate.

*Example 8*

By substituting the acetic anhydride and pyridine in Example 2, by methyl, ethyl, propyl, butyl, pentyl, hexyl, heptyl, and octyl chlorocarbonate and at least a stoichiometric amount of triethylamine there are obtained N,N'-dimethoxycarbonyldihydroactinospectacin, N,N'-diethoxycarbonyldihydroactinospectacin, N,N'-dipropoxycarbonyldihydroactinospectacin, N,N'-dibutoxycarbonyldihydroactinospectacin, N,N'-dipentyloxycarbonyldihydroactinospectacin, N,N'-dihexyloxycarbonyldihydroactinospectacin, N,N'-diheptyloxycarbonyldihydroactinospectacin, and N,N'-dioctyloxycarbonyldihydroactinospectacin.

*Example 9*

By substituting the acetic anhydride and pyridine in Example 3 by methyl, ethyl, propyl, butyl, pentyl, hexyl, heptyl, and octyl chlorocarbonate and at least a stoichiometric amount of triethylamine, there are obtained N,N'-dimethoxycarbonyldihydroactinospectacin 4,9-bis-(methyl carbonate),
N,N'-diethoxycarbonyldihydroactinospectacin 4,9-bis-(ethyl carbonate),
N,N'-dipropoxycarbonyldihydroactinospectacin 4,9-bis-(propyl carbonate),
N,N'-dibutoxycarbonyldihydroactinospectacin 4,9-bis-(butyl carbonate),
N,N'-dipentyloxycarbonyldihydroactinospectacin 4,9-bis-(pentyl carbonate),
N,N'-dihexyloxycarbonyldihydroactinospectacin 4,9-bis-(hexylcarbonate),
N,N'-diheptyloxycarbonyldihydroactinospectacin 4,9-bis-(heptyl carbonate), and
N,N'-dioctyloxycarbonyldihydroactinospectacin 4,9-bis-(octyl carbonate).

We claim:
1. A compound selected from the class consisting of dihydroactinospectacin of the formula:

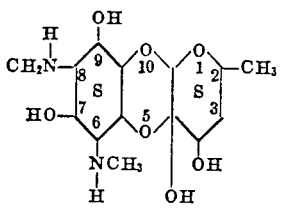

and the acid addition salts thereof.
2. Dihydroactinospectacin.
3. Dihydroactinospectacin dihydrochloride.
4. A compound of the formula:

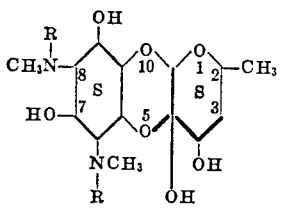

wherein R is alkanoyl of from 2 to 12 carbon atoms, inclusive.

5. N,N'-diacetyldihydroactinospectacin.
6. A compound of the formula:

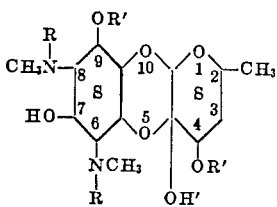

wherein R and R' are alkanoyl of from 2 to 12 carbon atoms, inclusive.
7. N,N'-diacetyldihydroactinospectacin 4,9-diacetate.

References Cited by the Examiner

UNITED STATES PATENTS

| | | | |
|---|---|---|---|
| 1,964,973 | 7/34 | Bockmühl et al. | 260—340.3 |
| 2,975,193 | 3/61 | Dice et al. | 260—326.5 |
| 2,997,471 | 8/61 | Cheney et al. | 260—559 |

OTHER REFERENCES

Bergy et al.: "Antibiotics and Chemotherapy," vol. 11, page 662 (1961).

IRVING MARCUS, *Primary Examiner.*

D. T. McCUTCHEN, WALTER A. MODANCE,
*Examiners.*